United States Patent [19]
Puett, Jr.

[11] Patent Number: 5,607,027
[45] Date of Patent: Mar. 4, 1997

[54] HYDRAULIC DRIVE SYSTEM FOR A VEHICLE

[75] Inventor: Edwin E. Puett, Jr., Stuart, Fla.

[73] Assignee: Anser, Inc., Stuart, Fla.

[21] Appl. No.: 430,243

[22] Filed: Apr. 28, 1995

[51] Int. Cl.$^6$ .............................................. B60K 17/356
[52] U.S. Cl. ........................... 180/242; 180/308; 60/427; 60/459
[58] Field of Search ..................... 180/165, 242, 180/247, 305, 308; 60/427, 459, 489

[56] References Cited

U.S. PATENT DOCUMENTS

| | | | |
|---|---|---|---|
| 1,156,818 | 10/1915 | Rich | 60/483 |
| 2,496,497 | 2/1950 | Russell | 188/274 |
| 2,547,578 | 4/1951 | Holmes | 180/307 |
| 2,933,158 | 4/1960 | Pitts | 188/274 |
| 3,091,930 | 6/1963 | Thoma et al. | 60/427 X |
| 3,092,970 | 6/1963 | Sampietro | 180/308 |
| 3,256,950 | 6/1966 | De Biasi | 180/242 |
| 3,369,360 | 2/1968 | De Biasi | 60/396 |
| 3,442,344 | 5/1969 | Ocule | 60/427 X |
| 3,448,577 | 6/1969 | Crawford | 60/420 |
| 3,459,393 | 8/1969 | Thomas | 244/63 |
| 3,498,420 | 3/1970 | Fawick | 188/292 |
| 3,509,721 | 5/1970 | Crawford | 60/419 |
| 3,700,060 | 10/1972 | Keene et al. | 180/165 |
| 3,724,583 | 4/1973 | Caldwell | 180/307 |
| 3,734,225 | 5/1973 | Kobald et al. | 180/307 |
| 3,892,283 | 7/1975 | Johnson | 180/165 |
| 3,900,075 | 8/1975 | Chichester et al. | 180/6.3 |
| 3,951,222 | 4/1976 | Fletcher | 180/242 |
| 4,023,641 | 5/1977 | Ganoung | 180/307 |
| 4,063,608 | 12/1977 | Sullivan | 180/215 |
| 4,098,083 | 7/1978 | Carman | 60/414 |
| 4,140,196 | 2/1979 | Brewer | 180/242 |
| 4,215,545 | 8/1980 | Morello et al. | 60/413 |
| 4,242,922 | 1/1981 | Baudoin | 74/687 |
| 4,350,220 | 9/1982 | Carman | 180/165 |
| 4,373,605 | 2/1983 | Sheppard, Sr. | 180/308 |
| 4,382,484 | 5/1983 | Anderson et al. | 180/165 |
| 4,387,783 | 6/1983 | Carman | 180/165 |
| 4,441,573 | 4/1984 | Carman et al. | 180/165 |
| 4,484,655 | 11/1984 | Sheppard, Sr. | 180/308 |
| 4,570,741 | 2/1986 | McCoy | 180/242 |
| 4,745,745 | 5/1988 | Hagin | 60/414 |
| 4,766,727 | 8/1988 | Dull et al. | 60/427 |
| 4,813,510 | 3/1989 | Lexen | 180/165 |
| 4,903,792 | 2/1990 | Ze-ying | 180/308 |
| 4,986,383 | 1/1991 | Evans | 180/165 |
| 5,062,498 | 11/1991 | Tobias | 180/308 |
| 5,168,703 | 12/1992 | Tobias | 60/418 |
| 5,230,402 | 7/1993 | Clark et al. | 180/307 |
| 5,263,401 | 11/1993 | Walker | 91/491 |

*Primary Examiner*—Brian L. Johnson
*Assistant Examiner*—Victor E. Johnson
*Attorney, Agent, or Firm*—Everett G. Diederiks, Jr.

[57] ABSTRACT

A hydraulic drive system for a vehicle includes a pressurizing circuit and a working circuit that are interconnected by suitable valving. The pressurizing circuit incorporates a fixed displacement pump which is driven by a prime mover having a nominal horsepower rating. The prime mover is shifted between an idling speed when the pressure sensed within the pressurizing circuit is within a desired range and an optimum high RPM range when the pressure within the pressurizing circuit falls below the desired range. At least one accumulator is provided in the pressurizing circuit. The working circuit includes a plurality of motor units for driving the vehicle wheels and a plurality of motor control valves which can be placed in a de-activated position to isolate the associated motor unit from the flow of pressurized fluid and an activated position wherein the motor unit aids in driving the vehicle. The vehicle is shifted between various gear ranges by controlling the activation/de-activation of the motor control valves such that, as vehicle speed and drive resistance decreases, the number of motor units being used to propel the vehicle is reduced from a maximum number of four motor units to a single motor unit. A flow control valve is provided to alter the volume of fluid flowing to the various motor units based on desired speed/acceleration parameters as determined by the vehicle operator through a conventional accelerator pedal.

31 Claims, 3 Drawing Sheets

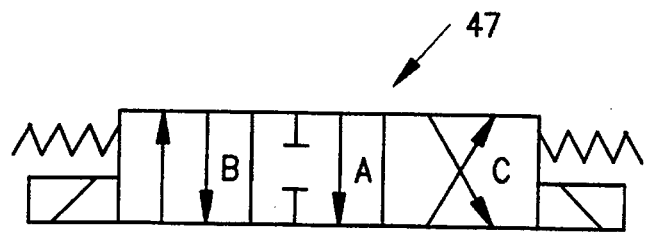
FIG. 2
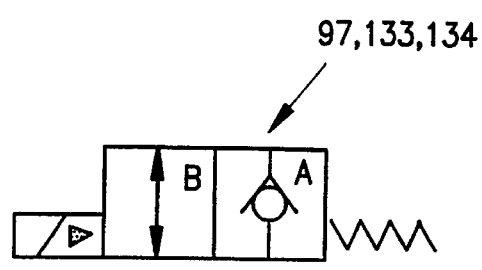
FIG. 3
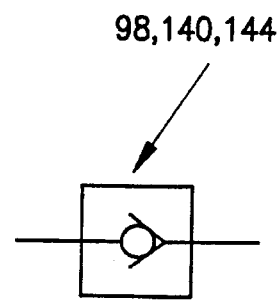
FIG. 4
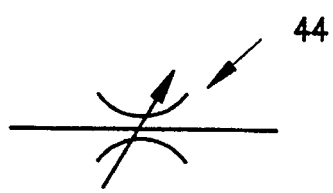
FIG. 5
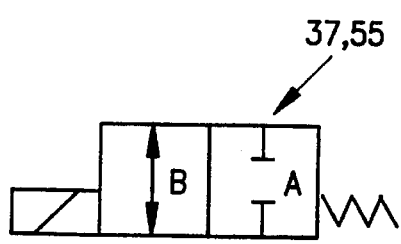
FIG. 6
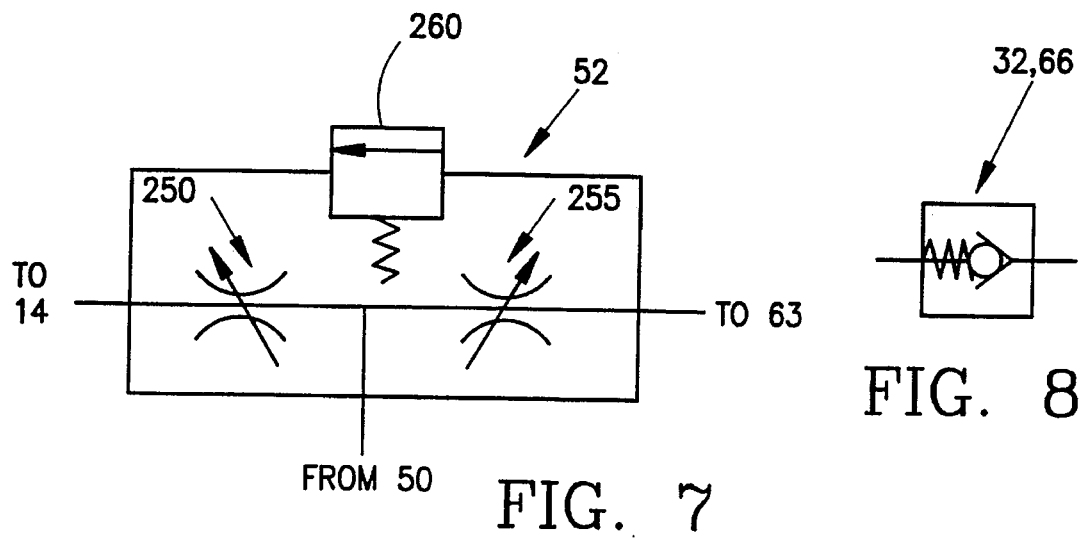
FIG. 7
FIG. 8

HYDRAULIC DRIVE SYSTEM FOR A VEHICLE

BACKGROUND OF THE INVENTION

1. Field of the Invention

The present invention pertains to the art of vehicles and, more particularly, to a hydraulic drive system for a vehicle.

2. Discussion of the Prior Art

Hydraulic drive systems for vehicles are known in the art. Most notably is the use of hydraulic drive systems on earthworking vehicles and other heavy machinery which operate in high torque/low speed environments. However, it has also been heretofore proposed to incorporate such drive systems on passenger vehicles.

In designing a new drive system for a passenger vehicle, one must carefully weigh the efficiency advantages of the drive system against its associated cost. Because of these considerations, initial attempts at such drive systems have generally concentrated on combining a conventional drivetrain with a hydraulic power system. More specifically, the internal combustion engine and transmission assembly is retained and the output thereof drives a pump which supplies the necessary fluid to the hydraulic power system. A major advantage of such an arrangement is that the vehicle can be readily assimilated into the marketplace since the driving characteristics, as seen from a driver of the vehicle, is essentially unchanged. Unfortunately, the cost associated with such vehicles is much higher than conventional internal combustion engine driven vehicles and therefore these hydraulically driven vehicles have not been commercially successful.

Other known system designs obviate the need for a conventional transmission and simply permit the internal combustion engine to directly drive the pump. In these known systems, a conventional accelerator or throttle member is controlled by the operator in order to adjust the operating speed of the engine and the engine is systematically started and stopped depending on sensed system pressure. Such known arrangements are disclosed, for example, in U.S. Pat. Nos. 4,098,083 and 4,350,220 issued to Carman. The problem with these known systems is that they generally require operator training and therefore cannot be readily assimilated into the marketplace, they are rather costly given the fact the internal combustion engines (or correspondingly sized electric motors) are large (generally commensurate in horsepower ratings to conventional vehicle engines) and they do not present a smoothly operating drivetrain that meet or exceed customary standards. For instance, the periodic starting and stopping of the engines as disclosed in the '083 and '220 patents create undesirable disturbances.

SUMMARY OF THE INVENTION

The basic objects of the present invention are to provide a hydraulic drive system for a passenger vehicle wherein the system will be user-friendly so as to not require any additional training for use; meet or exceed current standards with respect to acceleration, speed, handling, operating noise, dependability and cost; exhibit an increase in current mileage standards; and significantly reduce undesirable emissions.

These objects have been achieved by developing a hydraulic drive system that utilizes fixed displacement components, so as to avoid the inefficiencies, non-dependabilities and noise factors associated with variable displacement components, and which has a design based on volume instead of pressure. According to the invention, fixed displacement drive units are positioned at the vehicle wheels and torque requirements are met by the addition and subtraction of the number of drive units receiving fluid from a fixed displacement pump. With this arrangement, system pressure need only be maintained in an acceptable range. System pressure is developed by driving the fixed displacement pump by means of a power source or prime mover which can be constituted by an internal combustion engine that utilizes gasoline, propane, natural gas etc. or an electric motor. System pressure is built-up and maintained in an accumulator for use as needed.

In a preferred embodiment incorporating an internal combustion engine used to develop system pressure to four driven wheels, when additional system pressure is required, a pressure sensor triggers a speed regulator for the engine to increase the RPMs of the engine to an optimal running speed. When system pressure is again established within an acceptable range, the engine is automatically idled. As indicated above, shifting of the vehicle occurs by adding or subtracting the number of driven wheels. In a vehicle having separately controlled motors at each wheel, a maximum of four forward speeds are available by controlling the application of the individual fixed displacement drive units so that initially, as the vehicle is first accelerated, all four wheels are driven and, as the vehicle speed increases, the supply of working fluid to successive drive units can be cut-off. This operation is performed automatically through the use of valving and is based on a sensed operating pressure. The operator can define the shifting parameters in a manner analogous to conventional automobiles as well. For instance, in an automatic version of the present hydraulic drive system, a shift control lever can be placed in a drive (D) position for shifting through all drive ranges with only one drive unit being supplied with working fluid in the highest speed range, a low (D2) position which permits only certain of the drive units to be isolated from the working fluid, for example, limiting the minimum number of driven wheels to two, and a lower (D1) position which essentially constitutes an all-time four-wheel drive mode. Positioning of the shift control lever actually functions to actuate a predetermined set of drive unit control valves in each selected position. A manual shifting embodiment simply permits the driver to control the number of wheels being driven by directly actuating a predetermined set of drive unit control valves, so long as the system working pressure is within defined limits.

The vehicle operator controls the acceleration and speed of the vehicle by operating a conventional accelerator pedal. However, the accelerator pedal does not directly control the throttling of the engine. Instead, the accelerator pedal directly controls the position of a flow control valve arranged between the accumulator and the drive units. To the operator, there is an imperceivable difference in the manner in which movement of the accelerator pedal controls the speed and acceleration of the vehicle. By allowing the system to control the prime mover, as opposed to the prime mover controlling the system or the operator directly controlling the prime mover, a variety of prime movers can be readily incorporated in the overall drive system. In addition, due to pressure requirements given the system components and design, a significantly smaller prime mover is required (generally within a comparable operating range of approximately 10–50 HP) to operate the vehicle within conventional acceleration and speed ranges. In fact, it has been found that a 13.5 HP gasoline engine more than adequately performs the desired functions. Obviously, this reduction in engine weight and cost, in addition to the fact that no conventionally known transmission and drivetrain assembly is required, greatly reduces the associated weight of the vehicle and leads to increased mileage with reduced emissions. In fact, test results have indicated gasoline mileages of greater than 110 mpg. When a commensurate sized electric motor is utilized, it is estimated that the range of known battery arrangements will exceed 300 miles.

Additional objects, features and advantages of the hydraulic drive system of the present invention will become more readily apparent from the following description of preferred embodiments of the invention when taken in conjunction with the drawings wherein like reference numerals refer to corresponding parts in the several views.

BRIEF DESCRIPTION OF THE DRAWINGS

FIG. 2 is a schematic of a multi-position solenoid direction flow control valve incorporated in the hydraulic circuit of FIG. 1.

FIG. 3 is a schematic view illustrating a preferred embodiment of motor control valves incorporated in the hydraulic circuit of FIG. 1.

FIG. 4 illustrates a check valve arrangement incorporated in the hydraulic circuit of FIG. 1.

FIG. 5 represents a preferred embodiment of a non-compensated flow control valve incorporated in the hydraulic circuit of FIG. 1.

FIG. 6 represents another solenoid control valve incorporated in the hydraulic circuit of FIG. 1.

FIG. 7 schematically illustrates a spring loaded directional flow control valve with pressure release incorporated in the hydraulic circuit of FIG. 1.

FIG. 8 schematically illustrates another type of check valve incorporated in the hydraulic circuit if FIG. 1.

DETAILED DESCRIPTION OF THE PREFERRED EMBODIMENTS

Figure 1:
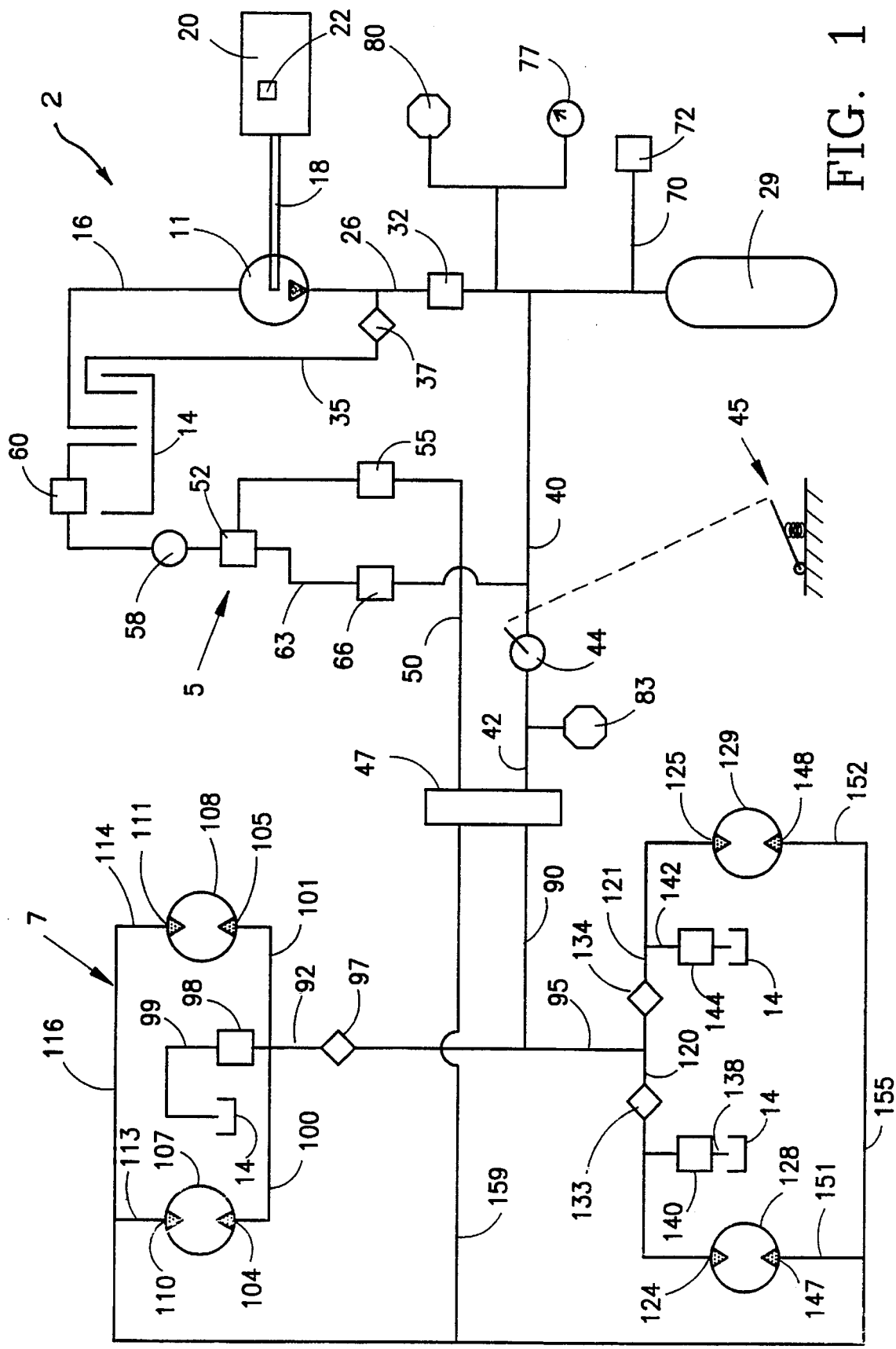
FIG. 1 is a schematic diagram of an illustrative hydraulic circuit embodiment for the hydraulic drive system of the present invention.

With initial reference to FIG. 1, a schematic of the hydraulic circuit for the drive system 2 of the present invention is illustrated. This hydraulic circuit is generally composed of a pressurizing circuit 5 and a working circuit 7. Pressurizing circuit 5 includes a fixed displacement pump 11 that is fluidly interconnected with a reservoir 14 through an inlet line 16. Fixed displacement pump 11 is driven by the output shaft 18 of a prime mover 20. Prime mover 20 can be constituted by an internal combustion engine that utilizes gasoline, propane, natural gas, etc. or an electric motor. Due to the overall construction of hydraulic drive system 2, prime mover 20 is considerably smaller than conventional passenger vehicle prime movers. More specifically, prime mover 20 has a horsepower rating generally in the order of 10–50 HP and, in the preferred embodiment, a gas driven internal combustion engine having a horsepower rating of 13.5 is utilized. When an internal combustion engine is utilized as prime mover 20, it is preferable to have prime mover 20 encased in a water cooling jacket, such as utilized on some known motorcycles and the like, in order to reduce undesirable noises. The operating speed of prime mover 20 is controlled by means of a speed regulating unit 22 which in the preferred embodiment functions to shift prime mover between two positions, i.e., an idling position and an optimum high range RPM position as will be more fully discussed below.

Fixed displacement pump 11 is also fluidly connected to an output line 26 that is directly connected to an accumulator 29. Although only a single accumulator 29 is depicted in FIG. 1, a bank of accumulators could be provided depending upon the size of the accumulators and the desired storage capacity for the system. In the preferred embodiment of the invention wherein the hydraulic drive system is incorporated in a standard passenger car, a nitrogen gas charged accumulator 29 having a capacity of 10 gallons of hydraulic fluid is utilized. Interposed between fixed displacement pump 11 and accumulator 29 within outlet line 26 is a one-way check valve 32 which only enables flow from fixed displacement pump 11 toward accumulator 29. Connected to output line 26 is also a bypass line 35. Interposed in bypass line 35 is a two-position valve 37. In the preferred embodiment, valve 37 constitutes a solenoid valve having a first position which blocks the flow of pressurized fluid in output line 26 from being redirected to reservoir 14 through bypass line 35 and a second position which permits such flow. The specific manner in which valve 37 is controlled will be more fully discussed below, however, in general, valve 37 permits this bypass flow when prime mover 20 is idling and prevents flow through bypass line 35 when the speed of prime mover 20 is increased to an optimum high RPM.

Pressurized fluid from fixed displacement pump 11 and accumulator 29 leads to a main pressure supply line 40 for hydraulic drive system 2. Main pressure supply line 40 includes a terminal portion 42 and has disposed therealong a flow control valve 44. As will be more fully discussed below, flow control valve 44 regulates the flow out of pressurizing circuit 5 based on the position of an accelerator pedal 45 that is actuated by an operator of the vehicle in a conventional manner. Terminal portion 42 of main pressure supply line 40 leads to a multiposition, directional flow control valve 47 which interconnects pressurizing circuit 5 with working circuit 7.

Pressurizing circuit 5 also includes a return line 50 that leads from directional flow control valve 47 to reservoir 14. Within return line 50 is located a flow redirecting valve 52 which functions to fluidly interconnect return line 50 with main pressure supply line 40 during braking of the vehicle as will also be more fully described below. Interposed in return line 50 between directional flow control valve 47 and flow re-directing valve 52 is a two-position valve 55. In the preferred embodiment, two-position valve 55 constitutes a solenoid valve that is normally closed and which is opened during operation of the vehicle in any drive mode. Also interposed in return line 50, between flow re-directing valve 52 and reservoir 14, is a filter 58 and an oil cooler 60. Oil cooler 60 preferably constitutes an air cooled heat exchanger arrangement which functions to cool the temperature of the hydraulic fluid utilized in the hydraulic drive system 2 of the present invention upon return of the oil to reservoir 14. Also stemming from flow re-directing valve 52 is an auxiliary pressure line 63 which is connected to main pressure supply line 40. Interposed in auxiliary pressure line 63, between flow re-directing valve 52 and main pressure supply line 40, is a check valve 66 which only permits flow in the direction from flow re-directing valve 52 toward main pressure supply line 40.

Pressurizing circuit 5 may also be provided with one or more power take-off (PTO) lines 70 leading to supplemental vehicle operating units such as that indicated at 72. These supplemental vehicle operating units 72 can constitute, for example, power steering units, alternators and the like that operate utilizing the pressure maintained within pressurizing circuit 5. Also connected in pressurizing circuit 5, downstream of fixed displacement pump 11, is a pressure gauge 77. This gauge, although unnecessary in the operation of the hydraulic drive system 2, is preferably provided as an indication to the operator of the vehicle of the pressure within main pressure supply line 40. Finally, pressurizing circuit 5 also includes two pressure sensitive relay switches 80 and 83. The first pressure sensitive relay switch 80 is interconnected in pressurizing circuit 5 so as to be directly responsive to the pressure within accumulator 29 and main pressure supply line 40. Second pressure sensitive relay switch 83 is interposed between flow control valve 44 and directional flow control valve 47. First and second pressure sensitive relay switches 80 and 83 function to automatically control the position of various valves incorporated in hydraulic drive system 2 as will be more fully described below in discussing the various operating modes of hydraulic drive system 2.

Working circuit 7 includes a main working line 90 that leads to first and second branch flow lines 92 and 95. In the embodiment illustrated in FIG. 1, a two-position front wheel motor control valve 97 is positioned within first branch flow line 92. First branch flow line 92 leads to reservoir 14 through a check valve 98 and a first suction line 99. The specific construction of check valve 98 will be more fully described below with reference to FIG. 4, however, it should be understood that this check valve allows total free flow in the direction of flow from reservoir 14 into first branch flow line 92 and prevents flow directly to reservoir 14. In the preferred embodiment, check valve 98 does not incorporate a tension spring as commonly found in check valves such that a certain resistance does not need to be overcome before the valve permits the desired flow. First branch flow line 92 leads to working conduits 100 and 101 which, in turn, lead to respective first fluid ports 104 and 105 of forward motor units 107 and 108 respectively. Forward motor units 107 and 108 have respective second fluid ports 110 and 111 which lead to lines 113 and 114. Lines 113 and 114, in turn, lead to a common conduit 116.

In a substantially similar manner, second branch flow line 95 leads to working conduits 120 and 121 that are respectively connected to first and second fluid ports 124 and 125 of rear motor units 128 and 129. At this point, it should be recognized that each of the motor units 107, 108, 128 and 129 are drivingly connected to a respective wheel of the vehicle. Interposed between second branch flow line 95 and first fluid port 124 for rear motor unit 128 is a two-position rear motor control valve 133. Likewise, a second two-position rear motor control valve 134 is interposed between second branch flow line 95 and fluid port 125 for rear motor unit 129. Located between rear motor control valve 133 and rear motor unit 128 is a second suction line 138 that is connected to reservoir 14 and which has interposed therein a check valve 140 which is constructed identical to check valve 98. Working conduit 121 is similarly connected to a third suction line 142 and reservoir 14 through a corresponding check valve 144. Rear motor units 128 and 129 include respective second fluid ports 147 and 148 that lead through lines 151 and 152 to a common conduit 155. Common conduits 116 and 155 meet to form an auxiliary working pressure line 159. As clearly shown in FIG. 1, main working line 90 and auxiliary working line 159 lead to directional flow control valve 47 and can be selectively isolated from or interconnected with the pressurized fluid in pressurizing circuit 5 during the operation of the vehicle.

Before detailing the manner in which the hydraulic drive system of the present invention functions to drive the vehicle through various drive ranges, the preferred construction of each of the valves and switches described above will be provided with reference to FIGS. 2–8. FIG. 2 illustrates a preferred construction for directional flow control valve 47. As previously indicated, directional flow control valve 47 is preferably comprised of a three-position solenoid control valve. Directional flow control valve 47 is biased into a central position designated at A wherein main working line 90 of working circuit 7 is isolated from main pressure supply line 40 of pressurizing circuit 5 and auxiliary working line 159 is connected to return line 50. During operation of the vehicle in a forward drive mode, directional flow control valve 47 is shifted to the position indicated at B such that main pressure supply line 40 is directly fluidly connected to main working line 90 and auxiliary working pressure line 159 remains fluidly connected with return line 50. When the vehicle is placed in a reverse operating mode, directional flow control valve 47 assumes position C wherein auxiliary working pressure line 159 is fluidly interconnected with main pressure supply line 40 and main working line 90 is interconnected with return line 50. The specific manner in which directional flow control valve 47 is controlled to shift between the various positions A, B and C will be described more fully below in describing the manner of operation of hydraulic drive system 2.

Reference will now be made to FIG. 3 which illustrates a preferred construction of each of the motor control valves 97, 133 and 134. As indicated above, these valves are preferably constituted by two-position solenoid control valves which are biased in a direction wherein these valves assume a position indicated in FIG. 3 at A. In this position, motor control valves 97, 133 and 134 constitute check valves which only permit flow therethrough from respective motors 107 and 108, 128 and 129 toward first and second branch flow lines 92 and 95. Therefore, when motor control valve 97, 133 and 134 are in position A, any pressurized fluid within first and second branch flow lines 92 and 95 are not permitted to flow into motor units 107, 108, 128 and 129. When any of valves 97, 133 and 134 are shifted to their respective positions B, fluid is permitted to flow from the respective branch flow lines 92 and 95 to the respective motors 107, 108, 128 and 129. As will be discussed more fully below, these motor control valves 97, 133 and 134 are individually controlled to selectively determine which of the motor units 107, 108, 128 and 129 are driven at any given time during operation of the vehicle.

FIG. 4 illustrates the preferred construction of check valves 98, 140 and 144. As previously indicated, these check valves are not spring biased such that predetermined resistances do not have to be overcome prior to opening of the valve. Again, these valves are utilized to interconnect reservoir 14 to the respective working conduits 100, 101, 120 and 121. These check valves only permit fluid to flow from the reservoir toward the working conduits and not vice versa.

FIG. 5 illustrates a preferred construction of flow control valve 44. As schematically illustrated, flow control valve 44 constitutes a needle-type flow restrictor that is provided with fine adjustment and which is mechanically linked to accelerator pedal 45. This type of flow control valve is readily available in the market and can constitute, for example, model No. FCV7-10 (NVF) flow valve sold by VICKERS. Flow control valve 44 is biased to a closed position to prevent flow therethrough unless accelerator pedal 45 is depressed by the vehicle operator. Although flow control valve 44 is mechanically connected to accelerator pedal 45, it should be readily understood that an electronic controlled valve arrangement could also be utilized wherein the degree of depression of accelerator pedal 45 is measured and that sensed degree of depression is utilized to control the opening of flow control valve 44. Therefore, flow control valve 44 can be mechanically connected to accelerator pedal 45 or electronically controlled based on the position of accelerator pedal 45.

FIG. 6 illustrates the preferred embodiment for valves 37 and 55. As indicated above, these valves preferably Constitute two-position normally closed solenoid valves. Therefore, these valves are biased to assume position A wherein they prevent the flow of fluid therethrough. However, these valves can be activated to shift to the positions indicated at B to permit the free flow of fluid therethrough. The manner in which these valves operate to shift between positions A and B will again be described more fully below in describing the operation of hydraulic drive system 2 in the various drive modes.

A schematic of flow re-directing valve 52 is presented in FIG. 7 and illustrates how the flow from return line 50 is normally directed to reservoir 14 through a first flow control valve 250. However, as will be more fully discussed below, when the vehicle is braked, first flow control valve 250 is simultaneously shifted with a second flow control valve 255 such that the amount of flow through return line 50 to reservoir 14 is decreased and a flow to auxiliary pressure line 63 is provided. During hard braking conditions, the pressure within return line 50 will increase and also the percentage of flow to auxiliary pressure line 63 will correspondingly increase. Pressure relief in the form of spring biased valve 260 is also provided within re-directing valve 52 such that pressure relief valve 260 will cause flow to reservoir 14 if the pressure within working circuit 5, as sensed in auxiliary pressure line 63, exceeds the maximum operating pressure of the system. In the preferred embodiment, this operating pressure is approximately 3,000 psi. Whenever the brake pedal of the vehicle is released, first and second flow control valves 250 and 255 will assume their normal operating positions wherein flow control valve 255 will be closed to prevent interconnection between return line 50 and auxiliary pressure line 63 and the flow from return line 50 will simply be drained to reservoir 14. Further details of this braking operation will be provided below in discussing the overall operation of drive system 2.

FIG. 8 schematically illustrates the construction of check valves 32 and 66. In general, check valves 32 and 66 are constructed in the manner similar to that of check valves 98, 140 and 144, however, these check valves are preferably spring biased to a closed position such that a certain pressure resistance must be overcome in order to permit the flow of fluid therethrough. Check valve 66 is actually interposed within auxiliary pressure line 63 in order to prevent undesirable leakage of pressure within pressurizing circuit 5. More specifically, check valve 66 functions to prevent pressurizing fluid within main pressure supply line 40 from leaking into reservoir 14 through flow re-directing valve 52. Of course, flow redirecting valve 52 could itself incorporate a valving arrangement which functions to prevent this reverse flow and therefore check valve would be unnecessary or provided merely as a precautionary measure.

Relay switches 80 and 83 are conventionally known and simply function to complete circuits for controlling solenoid activation based on predetermined sensed pressure levels. More specifically, relay switches 80 and 83, as will be described more fully below, function to control regulating unit 22, valve 37 and one or more motor control valves 97, 134. In the preferred embodiment, pressure sensitive relay switches 80 and 83 are each capable of relaying two different circuits off one supply line such that pressure sensitive relay switch 80 can control regulating unit 22 to either have prime mover 20 in an idle position when the pressure within accumulator 29 and main pressure supply line 40 is within a predetermined operating pressure range (i.e., approximately 2500–3000 psi) and to control regulating unit 22 to increase the operating speed of prime mover 20 to an upper, optimum RPM when the pressure within accumulator 29 and main pressure supply line 40 falls below the desired range. Although in the preferred embodiment prime mover 20 is only shifted between an idling and optimum RPM running speeds based on system pressure, it would be possible to have pressure sensitive relay switch 80 also control prime mover 20 to be shut down when pressurizing circuit 5 is in a high capacity pressure range. However, given that hydraulic drive system 2 is designed for specific use in passenger vehicles, this alternative embodiment is not preferred given the vibration and additional disturbances inherent in periodically re-starting prime mover 20. As will be more fully described below, second pressure sensitive relay switch 83 is capable of relaying at different sensed operating pressures between flow control valve 44 and directional flow control valve 47 to specifically control the shifting of motor control valves 97 and 134.

Figure 9:
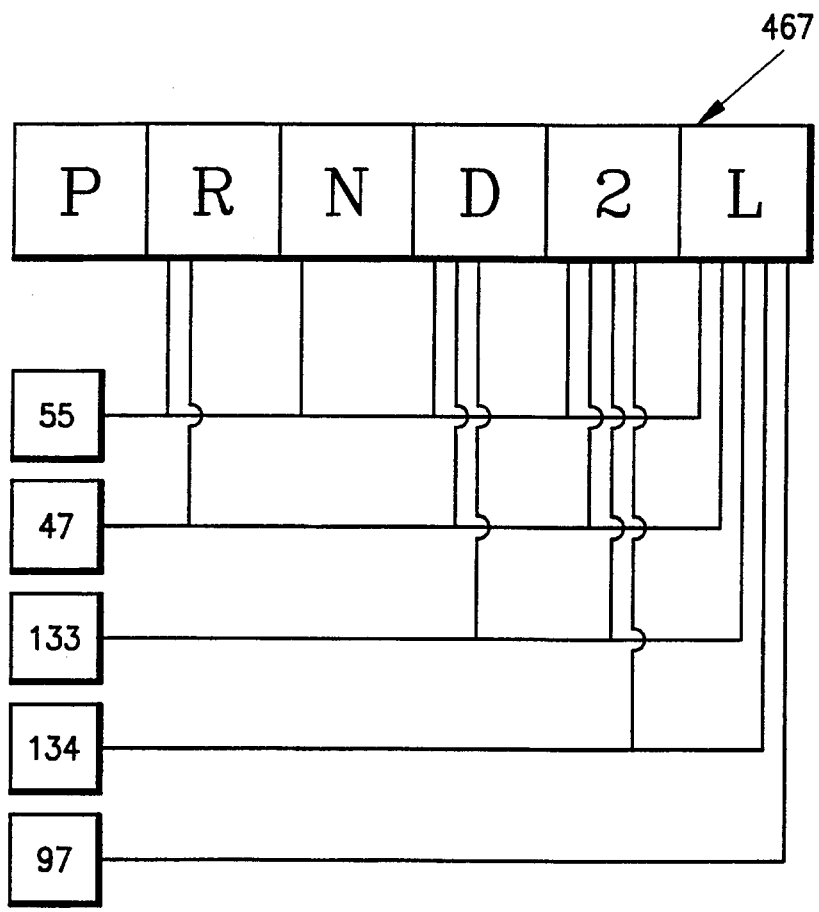
FIG. 9 illustrates the interrelationship between a gear shift lever position indicator and the valves represented in FIGS. 2, 3 and 6.

The functioning of hydraulic drive system 2 in the various operating modes will now be described with specific reference to FIG. 1 and 9, while keeping in mind the structure and available positions and functions of the valves and switches illustrated in FIGS. 2–8. FIG. 9 will be utilized to illustrate the operation of hydraulic drive system 2 in connection with an automatic drive arrangement similar to those of conventional vehicles wherein a operator controlled shift lever is used to selectively determine the mode of operation of the vehicle between park, reverse, neutral and various forward drive positions. FIG. 9 illustrates a conventional shift control lever position indicator at 467. When the gear shift lever is placed in the park (P) position, all of the solenoid valves incorporated in the hydraulic drive system 2 are simply biased to their neutral positions and therefore pressurizing circuit 5 is isolated from working circuit 7, except that auxiliary working line 159 is connected to return line 50 but isolated from reservoir 14 by means of valve 55, and no flow is permitted through motor units 107, 108, 128 and 129.

When the manual shift control lever is moved to the reverse (R) position, an electrical contact is made which causes directional flow control valve 47 to shift to position C and for solenoid valve 55 to shift to position B. Shifting of directional flow control valve 47 thereby interconnects main pressure supply line 40 with auxiliary working pressure line 159, as well as interconnecting main working line 90 to reservoir 14 through return line 50. In this mode of operation, pressurized fluid flowing through main pressure supply line 40 into auxiliary working line 159 leads to common conduits 116 and 155 and then to lines 113, 114, 151 and 152 in order to drive motor units 107, 108, 128 and 129 in reverse direction. Fluid flowing through motor units 107, 108, 128 and 129 will flow through the respective check valves of motor control valves 97, 133 and 134 since these motor control valves are in position A of FIG. 3. The fluid flowing through motor control valves 97, 133 and 134 leads to main working line 90 and then will be directed through return line 50 to reservoir 14 due to the position of directional flow control valve 47.

Since re-directing valve 52 is maintained in an operating state wherein no flow will be directed to auxiliary pressure line 63, all of the return flow will go through filter 58 and oil cooler 60. The speed at which the vehicle will be driven in reverse is controlled by the vehicle operator through accelerator pedal 45 and its interconnection with flow control valve 44. Simply stated, the more the operator pushes down on accelerator pedal 45, the higher the rate of flow through directional flow control valve 47 and the corresponding motor units 107, 108, 128 and 129. During this entire sequence, so long as the pressure within pressurizing circuit 5 is maintained within the predetermined operating level which is approximately 2500–3000 psi in the preferred embodiment, prime mover 20 will remain at idle. In fact, if pressurizing circuit 5 is initially, sufficiently pressurized, the vehicle can be initially driven without even starting prime mover 20. If prime mover 20 is idling, valve 37 will be maintained is position A illustrated in FIG. 6 to bypass output flow from fixed displacement pump 11 to reservoir 14 through bypass line 35 so as to unload prime mover 20. At this point it should be additionally noted that in the preferred embodiment, valve 37 is linked to the vehicle's starter switch such that valve 37 will be positioned to unload prime mover 20 during starting but will be fully controlled in the manner set forth herein thereafter. From the above, it should also be readily apparent that each of the vehicle wheels are driven in reverse which provides the maximum torque available according to this hydraulic drive system.

When the shift control lever is moved to the neutral position, directional flow control valve 47 again assumes position A wherein working circuit 7 is isolated from pressurizing circuit 5. In this condition, the vehicle is allowed to free wheel since motor units 107, 108, 128 and 129 can draw fluid from reservoir 14 directly through suction lines 99, 138 and 142 respectively. Outputs from motor units 107, 108, 128 and 129 will flow from common conduits 116 and 155 to auxiliary working line 159, through directional flow control valve 47 since it is in its respective position A, into return line 50 and to the reservoir 14 since solenoid valve 55 is shifted to position B as indicated in FIG. 6.

In the normal drive mode, solenoid valve 55 remains in its B position, directional flow control valve 47 is shifted to the B position wherein main pressure supply line 40 is directly connected to main working line 90 and auxiliary working line 159 is directly connected to return line 50, and rear motor control valve 133 is shifted to position B so as to directly interconnect branch line 95 with motor 128. Again, the operator of the vehicle controls the desired speed/acceleration through accelerator pedal 45 shifting flow control valve 44. If the vehicle is initially starting out from a stop position, the vehicle wheels will experience a high torsional resistance and this will affect the pressure within terminal portion 42 of main pressure supply line 40. This increase in pressure in terminal portion 42 will be sensed by second pressure sensitive relay switch 83. Pressure sensitive switch 83 will then function, at a pressure approximately equal to 2000 psi, to actuate solenoid valve 134 so as to shift this valve to its respective operating position B as shown in FIG. 3 such that flow will also go through working conduit 121 and the wheel associated with motor unit 129 will also be driven. In this two wheel drive mode, flow from the motor units 128 and 129 will again flow within common conduit 155, to auxiliary working pressure line 159, through directional flow control valve 47 into return line 50 and through valve 55 and re-directing valve 52 to reservoir 14. Obviously, this flow also goes through filter 58 and oil cooler 60.

If the pressure within terminal portion 42 exceeds a second preset threshold limit (approximately 2400 psi), pressure sensitive switch 83 will also actuate motor control valve 97 which will permit the flow of pressurized fluid through first branch flow line 92, working conduits 100 and 101 and motor units 107 and 108 will thereby drive the additional vehicle wheels. Therefore, it should be recognized that when the vehicle is started from an initial stop position, given that the associated torsional resistance is highest in this stopped position, the vehicle will assume the four wheel drive mode until the pressure within terminal portion 42 drops below the upper threshold as sensed by pressure sensitive switch 83 whereupon motor control valve 97 will again be shifted to its associated position A and only the two motor units 128 and 129 will be driving the vehicle. By this time, the vehicle would have assumed a much higher speed and, in a similar fashion, when the pressure within terminal portion 32 drops below the lower threshold pressure of approximately 2000 psi due to the absence of a major back pressure being created in main working line 90, motor control valve 134 will be de-activated and will assume its associated position A. At this higher vehicle speed, only motor 128 will be driving the vehicle until higher demands are made on the system based on gradients over which the vehicle is traveling, desired speed/acceleration by the operator or the like.

With the arrangement as described above, it should be readily apparent that a vehicle incorporating the hydraulic drive system 2 represented in FIG. 1 will be driven through 3 speed ranges represented by the number of wheels being driven. Of course, this number of ranges can be changed such that a four speed is provided by simply configuring the flow to motors 107 and 108 in the identical manner illustrated with respect to motors 128 and 129. Therefore, an additional motor control valve will be needed and pressure sensitive relay switch 83 will operate to control three separate such motor control valves at approximately 200 psi intervals between 2000 and 2400 psi. In addition, a two speed embodiment could be readily made by arranging the flow to motors 128 and 129 in the identical manner set forth with respect to motors 107 and 108. In addition, since a single motor control valve 97 is utilized to control the flow to motors 107 and 108, it should be readily apparent that a single motor unit having a transverse output shaft connected to a pair of laterally spaced wheels of the vehicle could be provided. Furthermore, it should be readily apparent that a manual shifting arrangement could be utilized wherein movement of the gear shift between first, second and third forward speeds would directly control the engagement and disengagement of the various motor units. In such an embodiment, it is still preferable to have an automatic override of the operator controls based on system pressure through the use of a pressure sensitive relay switch that operates in the manner set forth above with respect to pressure sensitive relay switch 83. Finally, it should be recognized that the order in which the vehicle wheels are driven could be changed such that at least one front wheel is initially driven.

When the pressure within pressurizing circuit 5 falls out of a desired operating range (i.e. below approximately 2500 psi) during operation of the vehicle, this is sensed by pressure sensitive relay switch 80 and relayed to regulating unit 22. Therefore, when pressurizing circuit 5 has a reduced pressure, regulating unit 22 is adjusted to shift the operating speed of prime mover 20 to an optimum high RPM range such that fixed displacement pump 11 will be driven with an increased output flow to enhance the pressurization of pressurizing circuit 5. Based on the above, it should be readily apparent that the hydraulic drive system 2 of the present invention is based on volume, i.e., the number of drive motors engaged is dependent upon the flow of permissible fluid therethrough since the operation of the vehicle during high torque resistance modes will create a back pressure to increase the number of motors and, as the vehicle speed increases with a corresponding decrease in resistance torque, the number of drive motors is reduced. Therefore, the system is based on volume and the pressure of the system need only be maintained within a desired operating range. This obviates the need to have a high horsepower output prime mover and to run the prime mover constantly.

The output from fixed displacement pump 11 is prevented from directly returning to reservoir 14 while prime mover 20 is operating at the high RPM range because two-position valve 37 is in the position designated as A in FIG. 6. Pressure sensitive relay switch 80 also controls the position of valve 37 along with regulating unit 22. More specifically, pressure sensitive relay switch 80 controls valve 37 to shift the valve to the position indicated at B in FIG. 6 thereby permitting fluid to flow from fixed displacement pump 11 back to the reservoir when prime mover 20 is idling, as discussed above, thereby reducing any load on prime mover 20. Of course, pressurizing circuit 5 still maintains a high pressure in main pressure supply line 40 since accumulator 29 is located upstream of check valve 32. Therefore, when regulating unit 22 is positioned such that prime mover is idled, valve 37 permits flow from fixed displacement pump 11 to reservoir 14 and when regulating unit 22 increases the operating speed of prime mover 20 to a high optimum RPM, valve 37 is simultaneously closed such that it assume the position A as shown in FIG. 6 whereby all of the output from fixed displacement pump 11 flows through check valve 32 to increase the pressure within accumulator 29.

Figure 10:
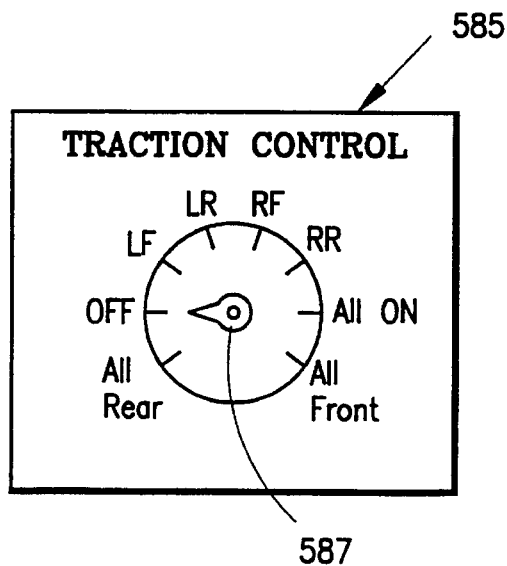
FIG. 10 illustrates a traction control console switch incorporated in the hydraulic drive system of the present invention.

In accordance with another feature of the present invention, the vehicle can include a traction control unit generally indicated at 585 in FIG. 10 wherein the operator can override the system and forcibly maintain any one or all of the vehicle drive motors in operation so long as the vehicle is not in the parked mode. This can be done by a simple rotatable knob 587 or the like which can be manually shifted by the operator. It should be noted that the present invention also incorporates a regenerative braking feature such that, during braking of the vehicle, motor units 107, 108, 128 and 129 will act as pumps and kinetic energy lost during braking will be transformed to potential energy by at least partially repressurize pressurizing circuit 5. As discussed above, re-directing valve 52 is normally in a neutral position allowing free flow of fluid from return line 50 to reservoir 14 through filter 58 and cooler 60 but re-directing valve 52 can be controlled through its connection to the vehicle brake pedal (as described above but not shown) such that re-directing valve 52 acts as a metered flow compensator. As operator pressure is applied to the brake pedal, re-directing valve 52 is controlled to disburse fluid at a metered rate into auxiliary pressure line 63 so as to direct a supply of auxiliary pressure to main pressure supply line 40. As indicated above, during braking, motor units 107, 108, 128 and 129 meet high resistance and actually start operating as pumps that are turned by the momentum of the vehicle wheels hitting the ground. The pressure developed in auxiliary pressure supply line 63 therefore creates a resistance to the rotation of the vehicle wheels. When accumulator 29 is at a high pressure range, a pressure relief arrangement within re-directing valve 52 (pressure relief valve 260 as discussed above) provides pressure relief to the system so that maximum resistance is still being applied to the drive units 107, 108, 128 and 129 such that maximum braking effect occurs but the excess fluid that can no longer be accepted by the accumulator 29 is permitted to flow to reservoir 14. During braking, since motor control valves 97, 133 and 134 do not permit the flow of fluid therethrough in a reverse direction, motor units 107, 108, 128 and 129 draw fluid from reservoir 14 through suction lines 99, 138 and 142 such that unpressurized fluid is supplied to motor units 107, 108, 128 and 129 which is then pressurized and sent through auxiliary working line 159 to return line 50. Suction lines 99, 138 and 142 also function through check valves 98, 140 and 144 in a similar manner during free wheeling of a vehicle such that, if any given motor is not being directly utilized to drive the vehicle, that corresponding motor unit is permitted to free wheel.

From an operator standpoint, a vehicle incorporating the hydraulic drive system of the present invention appears to be constructed and operates in an identical manner of a conventional passenger vehicle incorporating an internal combustion engine. Therefore, the system is user-friendly with the operator controlling the steering, gear shifting lever, accelerator pedal and brake pedal in a conventional manner.

Although described with respect to the preferred embodiments of the invention, it should be readily understood that various changes and/or modifications can be made to the hydraulic drive system of the present invention without departing form the spirit thereof. In general, the invention is only intended to be limited by the scope of the following claims.

I claim:

1. A fluid drive system in a vehicle comprising:

a prime mover including a rotatable driveshaft;

an adjustable vehicle accelerator control member;

reservoir means for maintaining a supply of working fluid;

a working circuit including:

a plurality of fluid motors, each of said motors being mechanically coupled to a predetermined wheel of the vehicle and including first and second fluid ports;

first working conduit means for fluidly interconnecting the first fluid port of each of said motors, said first working conduit means including a main working pressure line and at least first and second branch lines stemming from said main pressure line with each of said at least first and second branch lines fluidly interconnecting said main working pressure line with at least one of said plurality of motors;

a plurality of motor control valves, each of said motor control valves being arranged in a respective one of said at least first and second branch lines, interposed between a respective one of said motors and said main working pressure line, and being shiftable between a working position establishing fluid communication between the first fluid port of a respective one of said motors and said main working pressure line and a isolating position wherein fluid communication between the first fluid port of said respective one of said motors and said main working pressure line is interrupted;

second working conduit means for fluidly interconnecting the second fluid port of each of said motors, said second working conduit means terminating, within said working circuit, in a common, auxiliary working pressure line;

a pressurizing circuit including:

a fixed displacement pump drivingly coupled to the driveshaft of said prime mover, said fixed displacement pump including an inlet in fluid communication with said reservoir means and an outlet;

an accumulator in fluid communication with the outlet of said fixed displacement pump;

a main pressure supply line in fluid communication with said accumulator, said main pressure supply line including a terminal portion located downstream of said accumulator;

an adjustable flow control valve located in said main pressure supply line between said accumulator and the terminal portion of said main pressure supply line;

means for controlling the position of said flow control valve based on the position of said vehicle accelerator control member;

directional flow control valve means interconnected between said main pressure supply line, said main working pressure line, said auxiliary working pressure line and said reservoir means for controlling the flow of working fluid between said working and pressurizing circuits;

means for shifting each of said plurality of motor control valves between said working and isolating positions in order to control the number of driven vehicle wheels; and means for regulating an operating speed of said power source based on a sensed pressure in said pressurizing circuit.

2. The fluid drive system according to claim 1, further comprising means for fluidly connecting said plurality of motors with said reservoir means, said connecting means being interposed between each of said motors and a respective one of said motor control valves.

3. The fluid drive system according to claim 2, further including check valve means interposed between said reservoir means and said connecting means.

4. The fluid drive system according to claim 1, wherein said directional flow control valve means comprises a multi-position valve having a first position connecting said main pressure supply line with said main working pressure line and said auxiliary working pressure line with said reservoir; a second position isolating said working circuit from said main pressure supply line; and a third position interconnecting said auxiliary pressure supply line and said main working pressure line while fluidly interconnecting said main working pressure line and said reservoir means.

5. The fluid drive system according to claim 1, wherein said shifting means further includes an operator controllable shift lever adapted to shift said directional flow control valve means.

6. The fluid drive system according to claim 5, wherein said shifting means includes a pressure sensitive relay means located between said adjustable flow control valve and said plurality of motor control valves.

7. The fluid drive system according to claim 1, wherein said regulating means comprises a throttle regulating unit and a pressure sensitive relay means responsive to an operating pressure in said pressurizing circuit for controlling said throttle regulating unit.

8. The fluid drive system according to claim 7, wherein said throttle regulating unit assumes only a prime mover idling position and an optimum prime mover operating position.

9. The fluid drive system according to claim 7, wherein said pressure sensitive relay means is fluidly connected to said pressurizing circuit between said fixed displacement pump and said flow control valve.

10. The fluid drive system according to claim 1, wherein said pressurizing circuit further includes a return line interconnected between said reservoir means and said directional flow control valve means, a flow re-directing valve arranged in said return line and an auxiliary pressure line interconnected between said main pressure supply line and said flow re-directing valve.

11. The fluid drive system according to claim 10, wherein said flow re-directing valve incorporates pressure release means.

12. The fluid drive system according to claim 11, further comprising a normally closed valve interposed in said return line between said directional flow control valve means and said flow re-directing valve.

13. The fluid drive system according to claim 1, wherein said pressurizing circuit further comprises a bypass loop directly interconnecting a portion of said pressurizing circuit, between said fixed displacement pump and said accumulator, and said reservoir means.

14. The fluid drive system according to claim 13, further comprising a solenoid activated valve arranged in said bypass loop, said solenoid activated valve being shiftable to both permit a flow of working fluid through said bypass loop and prevent the flow of working fluid through said bypass loop.

15. The fluid drive system according to claim 1, further comprising operator controlled system over-ride means for selectively, positively maintaining any of said plurality of fluid motor control valves in said working position.

16. The fluid drive system according to claim 1, wherein said adjustable flow control valve constitutes a non-compensated adjustable flow control valve.

17. The fluid drive system according to claim 1, wherein said prime mover has a horsepower rating of between 10 and 50 hp.

18. A fluid drive system in a vehicle comprising:

a prime mover including a rotatable driveshaft;

an adjustable vehicle control member;

a reservoir for maintaining a supply of working fluid;

a working circuit including:

a plurality of fluid motors, each of said motors being drivingly connected to at least one wheel of the vehicle and including first and second fluid ports;

a first working conduit system fluidly connected to the first fluid port of each of said motors, said first working conduit system including a main working pressure line;

a second working conduit system fluidly connected to the second fluid port of each of said motors, said second working conduit system terminating, within said working circuit, in a common, auxiliary working pressure line;

motor control valve means interposed between said motors and at least one of said main and auxiliary working pressure lines for establishing fluid communication between at least one of said motors and at least one of said main and auxiliary working pressure lines in a working position and interrupting fluid communication between said motors and said at least one of said main and auxiliary working pressure lines in an isolating position;

a pressurizing circuit including:
- a pump drivingly coupled to the driveshaft of said prime mover, said pump including an inlet in fluid communication with said reservoir and an outlet;
- an accumulator in fluid communication with the outlet of said pump;
- a main pressure supply line in fluid communication with said accumulator, said main pressure supply line including a terminal portion located downstream of said accumulator;
- an adjustable flow control valve located in said main pressure supply line downstream of said accumulator, said adjustable flow control valve being linked to said adjustable vehicle control member such that selective movement of said adjustable vehicle control member repositions said adjustable flow control valve;

directional flow control valve means interconnected between said main pressure supply line, said main working pressure line, said auxiliary working pressure line and said reservoir for controlling the flow of working fluid between said working and pressurizing circuits; and means for shifting said motor control valves between said working and isolating positions.

19. The fluid drive system according to claim 18, further comprising a check valve unit interposed between said reservoir and a respective one of said plurality of motors.

20. The fluid drive system according to claim 18, wherein said directional flow control valve means comprises a multi-position valve having a first position connecting said main pressure supply line with said main working pressure line and said auxiliary working pressure line with said reservoir; a second position isolating said working circuit from said main pressure supply line; and a third position interconnecting said auxiliary pressure supply line and said main working pressure line while fluidly interconnecting said main working pressure line and said reservoir.

21. The fluid drive system according to claim 18, further comprising an operator controllable shift lever adapted to position said directional flow control valve means.

22. The fluid drive system according to claim 18, wherein said shifting means includes a first pressure sensitive relay for detecting an operating pressure downstream of said adjustable flow control valve.

23. The fluid drive system according to claim 22, further comprising a second pressure sensitive relay for detecting an operating pressure in said main pressure supply line and a regulating unit for controlling an operating speed of said prime mover, said regulating unit being responsive to a pressure detected by said second pressure sensitive relay unit.

24. The fluid drive system according to claim 18, wherein said pressurizing circuit further includes a return line interconnected between said reservoir and said directional flow control valve means, a flow re-directing valve arranged in said return line and an auxiliary pressure supply line interconnected between said main pressure supply line and said flow re-directing valve.

25. The fluid drive system according to claim 18, wherein said pressurizing circuit further comprises a bypass loop directly interconnecting a portion of said pressurizing circuit, between said pump and said accumulator, and said reservoir and a bypass valve arranged in said bypass loop, said bypass valve being shiftable to selectively permit a flow of working fluid through said bypass loop and prevent the flow of working fluid through said bypass loop.

26. The fluid drive system according to claim 18, further comprising operator controlled system over-ride means for selectively, positively maintaining a desired number of said motors in operation.

27. The fluid drive system according to claim 18, wherein said plurality of fluid motors are arranged, with respect to said first and second working conduits, parallel to one another.

28. A fluid drive system for a vehicle comprising:
- a plurality of fluid, wheel driving motors;
- motor control-valve means for controlling a number of said plurality of fluid motors used to drive the vehicle;
- a prime mover including a rotatable driveshaft;
- a regulating unit adapted to control an operating speed of said prime mover;
- a reservoir housing a source of working fluid;
- a pump drivingly coupled to the driveshaft of said prime mover, said pump being in fluid communication with said source of working fluid and a pressurizing circuit leading to said plurality of fluid motors;
- a flow control valve interposed in said pressurizing circuit between said pump and said plurality of fluid motors;
- a first relay unit for detecting a first operating condition of said fluid drive system associated with an available amount of working fluid in said pressurizing circuit between said pump and said flow control valve and signalling said regulating unit to control the operating speed of said prime mover; and
- a second relay unit for detecting a second operating condition of said fluid drive system associated with a flow of working fluid through said flow control valve to said plurality of fluid motors and signalling the second operating condition to said motor control valve means to control the number of said plurality of fluid motors used to drive the vehicle.

29. The fluid drive system according to claim 28, further comprising an accumulator interposed in said pressurizing circuit between said pump and said flow control valve for storing a supply of pressurized working fluid.

30. The fluid drive system according to claim 29, further comprising a manually adjustable vehicle control member, said vehicle control member being linked to said flow control valve such that said flow control valve is shifted in dependence upon movement of said vehicle control member.

31. The fluid drive system according to claim 30, further comprising a plurality of one-way check valve units, each of said check valve units being interposed in a line between said motor control valve means and a respective one of said plurality of fluid motors and interconnecting said line and said reservoir, each of said check valves permitting flow from said reservoir to said line but preventing flow from within said line directly to said reservoir.

\* \* \* \* \*